June 15, 1965   C. W. ROBERTS   3,188,860
ANGULAR POSITION INDICATING DEVICE
Filed Aug. 30, 1962

INVENTOR.
CHARLES W. ROBERTS
BY *Elliott & Pastoriza*
ATTORNEYS

ANGULAR POSITION INDICATING DEVICE
Charles W. Roberts, Inglewood, Calif., assignor to Ormond Inc., a corporation of California
Filed Aug. 30, 1962, Ser. No. 220,492
13 Claims. (Cl. 73—88.5)

This invention relates generally to indicating instruments and more particularly to a novel device for indicating angular positions.

Angular position indicators of the type under consideration are used to provide a substantially instantaneous reading of the angular position of a shaft or other rotating member. While it is possible to provide such indications by means of a mechanical shaft connecting directly from the rotatable member to an indicating pointer, there are many situations in which it is desired to provide a remote indication. In such cases, the length of any type mechanical shaft would usually preclude its use as an accurate means for transmitting the angular information. This is because of friction in the shaft itself as well as twist, hysteresis effects, and other mechanical problems inherent in extremely elongated shafts, particularly of the flexible type.

For remote indication, it is possible to employ electrical means such as a Selsyn system. However, such systems generally require three phase electrical power, are bulky, and because the angular positioning depends upon the generation of magnetic field vectors, the overall response time is limited.

A desirable feature of any type of angular position indicating device is to enable remote indication to be effected substantially instantaneously and with a high degree of accuracy. Further, it is desirable that the instrument itself exert no appreciable counter-torque on the rotating member to which it is secured, unless a given resorting torque for certain applications is desired.

Bearing all of the foregoing in mind, it is a primary object of this invention to provide an angular position indicating means in which the various problems outlined above are substantially overcome.

More particularly, it is an object to provide an angular position indicating device capable of providing substantially instantaneous indications of angular positions at remote locations.

Another important object is to provide an angular position indicating device which may be designed to exert no appreciable counter-torque on the member whose angular position is to be indicated.

Another object in conjunction with the foregoing is to provide an angular position indicating device in which a pre-determined variable counter-torque constituting a function of angular position may be provided if desired.

Other objects of this invention are to provide an improved angular position indicating device which is compact, extremely simple to operate, and relatively inexpensive to manufacture.

Briefly, these and many other objects and advantages of this invention are attained by providing a casing structure incorporating a shaft member, one end of which is adapted to be secured in a rotatable member whose angular position is to be remotely indicated. At least two bearing means are provided in the casing for rotatably mounting the shaft in a bent configuration. This is achieved by forming the axis of one of the bearing means at a slight angle to the axis of the other bearing means and securing the bearing means in fixed spaced relationship adjacent the opposite ends of the shaft itself. The plane of the bend in the shaft is thus fixed so that rotation of the shaft will result in a continuous bending action.

To provide a remote indication of the bending portions of the shaft and therefore the angular position of the shaft, there are provided strain gauge means secured to the shaft intermediate the two bearing support means. In the preferred embodiment of the invention, four such strain gauges are provided and suitably connected in an electrical bridge network to provide an output electrical signal constituting a function of the stresses developed in the strain gauges. Since the stresses in particular strain gauges are determined by the degree of rotation of the shaft, an output indicating means responsive to the signals may be calibrated to indicate directly the angular position of the shaft from a pre-determined starting point. The wires connecting the strain gauges within the casing structure to the indicating means may be as long as desired so that remote indication may be provided.

A better understanding of the invention will be had by now referring to preferred embodiments thereof as illustrated in the accompanying drawings, in which.

Figure 1:
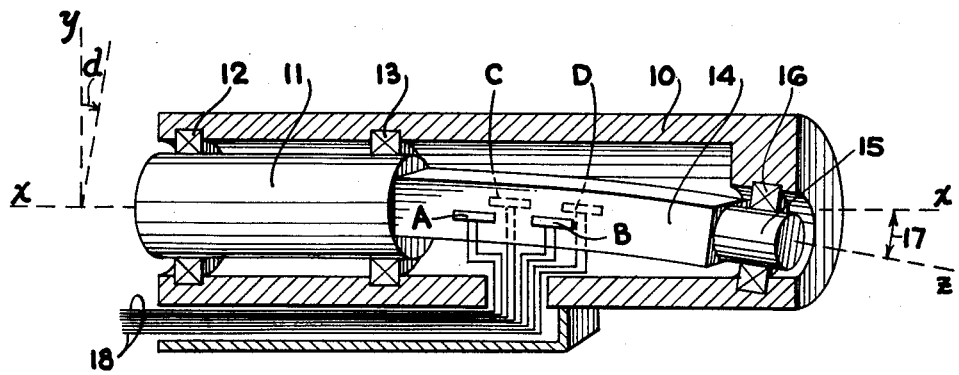
FIGURE 1 is a perspective view partly in cross section of a first embodiment of the angular position indicating device.

Referring first to FIGURE 1, there is shown a hollow casing 10 incorporating an elongated member in the form of a shaft. A first portion 11 of this shaft is supported in first and second shaft journalling bearings 12 and 13. The bearings 12 and 13 are in co-axial spaced relationship with respect to a given axis X—X so that the portion 11 of the shaft is co-axial with the axis X—X.

Another portion of the shaft is indicated at 14 and has a symmetrical cross section which may, for example, be circular or square. In FIGURE 1, this portion is shown as square and terminates in a circular end 15 journalled in bearing 16 having a journalling axis Z forming a small angle 17 with the axis X—X of the bearings 12 and 13. By this arrangement, the second shaft portion 14 is caused to assume a bent configuration, the bend, however, being well within the elastic limit of the material comprising the shaft. Because of the rigid relative securement of the various bearings in the casing 10, the plane of the bend of the shaft is stationary. As a consequence, rotation of the left end of the shaft portion 11 as indicated by the arrow 11 will cause a cyclical bending of portions of the shaft measured circumferentially about the shaft.

As shown in FIGURE 1, the portions of the shaft undergoing maximum bending are provided with strain gauge means comprising, preferably, four strain gauges A, B, C, and D spaced in pairs on opposite sides of the shaft. Gauges A and B will have strains opposite to the strains developed in gauges C and D when the shaft is rotated from the position shown. If the shaft is rotated through 180 degrees, the strain gauges A and B will assume the positions of the strain gauges C and D prior to rotation and, therefore, the stresses in the opposite pairs will be reversed.

Suitable leadout conductors 18 connecting from the strain gauges may extend to a remote location to suitable indicating equipment to provide a measure of the relative stresses in the various gauges. Since these stresses depend on the angular position of the shaft 11, the output signal will constitute a function of the degree of rotation of the shaft.

Figure 2:
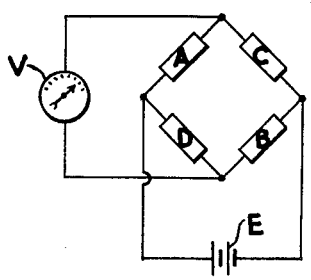
FIGURE 2 is a schematic circuit diagram of the electrical components of the device.

The preferred indicating means is illustrated in FIGURE 2. As shown, the strain gauges A, B, and C, D are connected in a bridge circuit wherein the opposite arms of the bridge include the gauges making up each pair.

If a battery E is connected across the diagonal junction points as indicated in FIGURE 2 and a simple meter V electrically connected across the other two diagonals of the bridge, the reading on the meter will be a function of the relative stresses in the respective strain gauges and thus provide the desired output reading.

Figure 3:
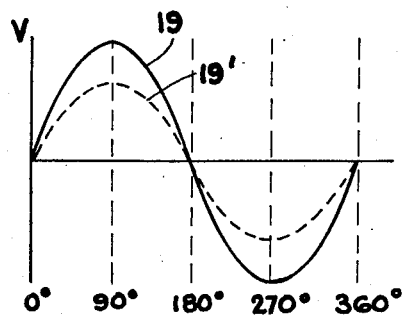
FIGURE 3 represents one type of output function provided by the instrument.

If the cross section of the shaft is symmetrical as shown in FIGURE 1, and if the strain gauges are positioned at 180 degrees as also shown and described, the output signal registered by the meter V will constitute a sine wave as indicated at 19 in FIGURE 3. It will be noted that after rotation through 180 degrees to a position in which the strain gauges A and B occupy the positions formerly occupied by the strain gauges C and D, the signal reverses in polarity to provide the lower half of the sine wave upon rotation through another 180°. A continued rotation through another 360° would provide an identical signal so that the instrument need never be rotated more than 360° to provide full scale readings. In actual practice, the magnitude of the reading without regard to polarity between zero and maximum signal can be achieved by rotation through an angle of only 90° and therefore the shaft may be designed to rotate only through this amount and slip rings and the like are not necessary for the leads 18 which leads may constitute "pigtails." It is possible, of course, to employ this sine wave signal to operate any type of meter in which the angle whose sine is equal to the magnitude of its input is indicated to thereby provide a direct angle indication.

Further, it should be noted that not only is there an advantage in providing a direct sine wave signal function, but also the provision of a perfectly symmetrical section results in no appreciable counter-torque. In fact, the torque required to turn the shaft portion 11, if friction in the bearings is neglected, is zero.

There are instances, however, in which it may be desirable to provide a small elastic type restoring torque to angular movement of the shaft. Towards this end, and provided the movement is confined to angles less than ninety degrees, the shaft may include a portion of rectangular cross section. Thus, referring to FIGURE 4, there is shown a modified shaft 20 having a portion 21 of rectangular cross section. The strain gauges A, B, C, and D are connected in pairs to opposite sides of a symmetrical section as before. Because the depth $d$ of the rectangular cross section is less than the width $w$, there will be a tendency for the shaft to seek a bent position in which the elastic forces tending to straighten the same are minimal. In the particular configuration illustrated in FIGURE 4, the shaft is stable and will tend to rotate to the position shown if angularly displaced therefrom by less than ninety degrees.

It should be noted that the rectangular cross section serves two purposes. First, by adjusting the ratio of the width to the thickness and by adjusting the shaft length over which the rectangular cross section extends, any value of restoring force or moment tending to return the shaft to a zero position can be obtained. In addition, linearization of the plot of output signal versus shaft position can be accomplished.

Figure 4:
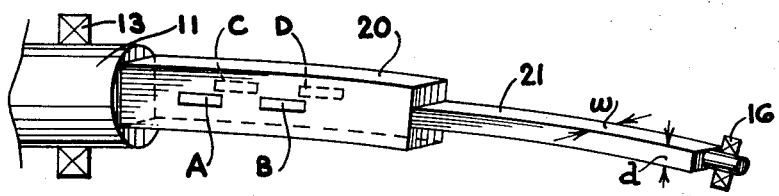
FIGURE 4 is a fragmentary perspective view showing a modified construction; and, FIGURE 5 is another fragmentary perspective view of a further modified construction.

For example, when linearization of the sine wave output curve is desired without decreasing the full scale output signal of the device for a given angle, the rectangular section can be incorporated as shown in FIGURE 4. The strain gauges will be mounted on the shaft near bearing 13 on a section having a symmetrical cross section as described. The rectangular cross section of the shaft will be so oriented that the narrow dimension $d$ of the rectangle will be in a plane parallel to the plane in which the strain gauges are applied. For this configuration, the output signal is proportional to the expression $(\cos^2 a + K \sin^2 a) \sin a$. Where $a$ is the angle of rotation and K is a function of the ratio of the maximum moment of inertia to the minimum moment of inertia of the rectangular section.

Should neither restoring moment nor linearization be desired, the shaft can be made to have a symmetrical cross section for its entire length and the strain gauges applied as discussed previously.

Figure 5:
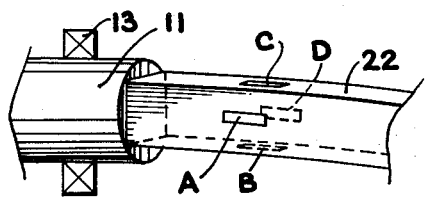

FIGURE 5 illustrates an alternative connection of the strain gauges useable in either FIGURE 1 or FIGURE 4. In this modification, the gauges are successively spaced at 90 degrees on a square shaft 22 as shown. With the gauges connected in this manner, the output signal will be a sine wave of less amplitude as indicated at 19' in FIGURE 3.

It is also possible to connect the gauges in other positions and to employ shafts of non-symmetrical cross sections different from rectangular to enable arbitrary functions to be generated.

The operation of the device will be evident from the foregoing description. To provide an angular position measurement, the first portion of the shaft 11 protruding from the left end of the casing 10 is coupled to any member, the angle of rotation of which it is desired to measure. The leads 18 from the various strain gauges may then be connected into a bridge circuit at a remote location as shown in FIGURE 2 and a meter V employed which will provide an output reading of the angle whose sine is proportional to the signal from the bridge. There is thus provided a direct reading of the shaft position at any time.

The entire device as described may be made extremely compact as a consequence of the use of the strain gauges. Furthermore, it constitutes an extremely rugged and mechanically simple structure so that high reliability and low cost are realizable in its manufacture.

While only two particular embodiments of the angular position indicating device have been shown, it should be understood that various other changes and modifications that fall clearly within the scope and spirit of the invention will occur to those skilled in the art. The position indicating device is therefore not to be thought of as limited to the particular examples set forth merely for illustrative purposes.

What is claimed is:

1. An angular position indicating device comprising: an elongated member; at least two bearing means having their axes at an angle to each other journalling spaced portions of said member, said bearing means being fixedly mounted relative to each other so that said member is constrained to a bent configuration in a given bending plane and so that rotation of said member about its own axis results in the bending of portions of said member relative to itself; and means responsive to the said bending of portions of said member upon rotation of said member about its own axis to provide an indication of the angular degree through which said member is rotated.

2. An angular position indicating device comprising: an elongated member; at least two bearing means having their axes at an angle to each other journalling spaced portions of said member, said bearing means being fixedly mounted relative to each other so that said member is constrained to a bent configuration in a given bending plane; strain gauge means secured to said member and responsive to bending thereof whereby rotation of said member to bend portions when in said bending plane establishes stress changes in said strain gauge means; and means providing an electrical signal in response to said stress changes in said strain gauge means.

3. A device according to claim 2, in which said strain gauge means comprises four strain gauges spaced in opposite pairs 180 degrees on opposite sides of said member.

4. A device according to claim 2, in which said strain gauge means comprises four strain gauges successively spaced ninety degrees circumferentially about said member.

5. A device according to claim 2, in which the cross section of said member at the area in which said strain gauge means are secured to said member is symmetrical.

6. A device according to claim 2, in which the remaining section of said member beyond the area in which said strain gauge means are secured is rectangular.

7. An angular position indicating device comprising, in combination: a casing; a shaft passing within said casing; first and second shaft journalling bearings in said casing in spaced co-axial alignment supporting a first portion of said shaft adjacent to one end of said shaft; a third shaft journalling bearing in said casing supporting the other end of said shaft, the axis of said third shaft journalling bearing forming an angle with respect to the axis of said first and second shaft journalling bearings so that said shaft is constrained to a bent configuration; strain gauge means connected to said shaft intermediate said second and third shaft journalling bearings; and indicating means responsive to signals from said strain gauge means resulting from a rotation of said one end of said shaft through a given angle whereby an indication constituting a function of said given angle is provided.

8. A device according to claim 7, in which said strain gauge means comprises pairs of strain gauges spaced 180 degrees on opposite sides of said shaft about a symmetrical portion thereof.

9. A device according to claim 8, in which said indicating means includes an electrical bridge network having four arms, opposite arms including strain gauges on the same side of said shaft.

10. A device according to claim 7, in which said strain gauge means comprises four strain gauges successively spaced ninety degrees circumferentially about said shaft.

11. A device according to claim 10, in which said indicating means includes an electrical bridge network having four arms, adjacent arms including diametrically oppositely positioned strain gauges respectively.

12. A device according to claim 7, in which said shaft has a square cross section, said signals from said strain gauge means being proportional to the sine of said given angle through which said shaft is rotated.

13. A device according to claim 7, in which another portion of said shaft is rectangular in cross section whereby a resilient mechanical restoring force is exerted by said shaft when rotated through said given angle.

References Cited by the Examiner
UNITED STATES PATENTS

| | | | |
|---|---|---|---|
| 2,546,155 | 3/51 | Haber et al. | 33—139 |
| 2,712,645 | 7/55 | Keene | 340—345 |
| 2,909,764 | 10/59 | Chambers | 340—177 |
| 2,913,690 | 11/59 | McGrath | 338—2 |

RICHARD C. QUEISSER, *Primary Examiner.*

JOSEPH P. STRIZAK, *Examiner.*